(12) United States Patent
Nakawatari et al.

(10) Patent No.: US 12,078,238 B2
(45) Date of Patent: Sep. 3, 2024

(54) LUBRICATION STRUCTURE FOR VEHICLE

(71) Applicants: TOYOTA JIDOSHA KABUSHIKI KAISHA, Toyota (JP); AISIN CORPORATION, Aichi-ken (JP)

(72) Inventors: Kodo Nakawatari, Nagakute (JP); Masaya Hayasaka, Kariya (JP); Shunzo Itai, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 103 days.

(21) Appl. No.: 17/940,212

(22) Filed: Sep. 8, 2022

(65) Prior Publication Data

US 2023/0146341 A1 May 11, 2023

(30) Foreign Application Priority Data

Nov. 11, 2021 (JP) ................. 2021-184404

(51) Int. Cl.
*F16H 57/04* (2010.01)
*B60K 6/40* (2007.10)

(52) U.S. Cl.
CPC ..... *F16H 57/0423* (2013.01); *F16H 57/0412* (2013.01); *F16H 57/0439* (2013.01);
(Continued)

(58) Field of Classification Search
CPC ............ F16H 57/0423; F16H 57/0412; F16H 57/0439; F16H 57/0471; F16H 57/0476; F16H 57/0435; F16H 57/0483; F16H 57/0436; F16H 57/0404; F16H 57/0413; F16H 57/0421; F16H 57/0475; F16H 57/0479; B60K 6/40; B60K 6/445; B60Y 2200/92; B60Y 2306/03; Y02T 10/62; Y02T 403/20; Y02T 403/32762;
(Continued)

(56) References Cited

U.S. PATENT DOCUMENTS 1,055,619 A * 3/1913 Dunn .................... F16H 61/444
 60/483
1,609,833 A * 12/1926 Robson ................... F16H 39/14
 105/62.1

(Continued)

FOREIGN PATENT DOCUMENTS

JP 2014-119085 A 6/2014
JP 2019-162927 A 9/2019

*Primary Examiner* — Timothy Wilhelm
(74) *Attorney, Agent, or Firm* — Oliff PLC (57) ABSTRACT

A lubrication structure for a vehicle includes: a first lubrication pipe through which lubricating oil is supplied to a rotary machine disposed in a case; a second lubrication pipe through which lubricating oil is supplied to a bearing member disposed in the case; and an oil pump that supplies lubricating oil to the first and second lubrication pipes. The lubrication structure includes a first oil hole in the case that is connected to the first oil hole, and a second oil hole in the case, lubricating oil flowing into the second oil hole from the second lubrication pipe. A connection portion between the first lubrication pipe and the first oil hole is located above an opening portion of the second oil hole such that at least a part of lubricating oil that has flowed out from the connection portion flows into the second oil hole.

5 Claims, 6 Drawing Sheets

(52) U.S. Cl.
CPC .......... *F16H 57/0471* (2013.01); *B60K 6/40* (2013.01); *B60Y 2200/92* (2013.01); *B60Y 2306/03* (2013.01); *F16H 57/0476* (2013.01)

(58) Field of Classification Search
CPC .......... F16C 11/0647; F16C 11/0628; F16C 17/246; F16C 2326/24; B62D 7/16
See application file for complete search history.

(56) References Cited

U.S. PATENT DOCUMENTS

| | | | | |
|---|---|---|---|---|
| 4,233,858 A * | 11/1980 | Rowlett | ................. | B60K 6/30 290/22 |
| 4,359,909 A * | 11/1982 | Sogo | ................. | F16N 7/16 184/6.12 |
| 5,046,306 A * | 9/1991 | Borre, Jr. | ................. | F16N 7/32 60/39.08 |
| RE34,833 E * | 1/1995 | Hasegawa | ................. | B60K 17/28 475/83 |
| 5,557,977 A * | 9/1996 | Stockton | ................. | F16H 47/085 475/47 |
| 5,564,518 A * | 10/1996 | Ishii | ................. | B60K 17/344 74/665 F |
| 5,644,954 A * | 7/1997 | Matsufuji | ................. | F16H 57/0421 74/606 R |
| 6,048,288 A * | 4/2000 | Tsujii | ................. | B60W 10/30 903/910 |
| 6,964,631 B2 * | 11/2005 | Moses | ................. | F16H 61/0031 180/65.265 |
| 7,421,917 B2 * | 9/2008 | Nishino | ................. | B60K 17/105 74/15.82 |
| 7,713,157 B2 * | 5/2010 | Hastings | ................. | H02K 7/116 475/5 |
| 7,726,275 B2 * | 6/2010 | Deniston | ................. | F02N 11/003 123/198 C |
| 8,092,326 B2 * | 1/2012 | Amanuma | ................. | F16H 55/36 474/84 |
| 8,221,284 B2 * | 7/2012 | Asao | ................. | H02K 7/108 180/53.8 |
| 8,616,310 B2 * | 12/2013 | Lopez | ................. | B60L 8/003 180/53.3 |
| 8,649,925 B2 * | 2/2014 | Light | ................. | G16Z 99/00 180/65.21 |
| 8,653,704 B2 * | 2/2014 | Atarashi | ................. | H02K 9/19 310/58 |
| 8,678,784 B2 * | 3/2014 | Atarashi | ................. | B60K 6/26 417/372 |
| 8,689,759 B2 * | 4/2014 | Schultz | ................. | F02N 11/003 123/179.31 |
| 8,808,124 B2 * | 8/2014 | Major | ................. | B60K 25/00 180/65.265 |
| 8,840,511 B2 * | 9/2014 | Seno | ................. | F16H 57/0423 184/6.12 |
| 8,905,885 B2 * | 12/2014 | Yamamoto | ................. | B60K 6/26 184/6.12 |
| 8,939,240 B2 * | 1/2015 | Wehrwein | ................. | B60W 10/30 180/53.8 |
| 8,961,360 B2 * | 2/2015 | Ooiso | ................. | B60L 3/0023 475/331 |
| 8,972,139 B2 * | 3/2015 | Shinohara | ....... | B60W 30/18109 701/22 |
| 9,022,174 B2 * | 5/2015 | Takagi | ................. | F16H 57/0476 184/6.12 |
| 9,033,074 B1 * | 5/2015 | Gates | ................. | F16D 11/10 180/53.6 |
| 9,145,054 B1 * | 9/2015 | Xykis | ................. | F16H 7/06 |
| 9,150,090 B2 * | 10/2015 | Hiyoshi | ................. | B60K 17/046 |
| 9,156,348 B1 * | 10/2015 | Swales | ................. | B60K 1/00 |
| 9,266,423 B2 * | 2/2016 | Hoshinoya | ................. | B60K 6/48 |
| 9,487,086 B2 * | 11/2016 | Collett | ................. | B60K 25/06 |
| 9,500,197 B2 * | 11/2016 | Schultz | ................. | F16H 57/0439 |
| 9,638,076 B2 * | 5/2017 | Nitta | ................. | F16H 57/0439 |
| 9,671,016 B2 * | 6/2017 | Nakayama | ................. | F16H 48/27 |
| 9,726,057 B2 * | 8/2017 | Yamauchi | ................. | H02K 7/116 |
| 9,745,720 B2 * | 8/2017 | Naito | ................. | B60K 6/365 |
| 9,751,411 B2 * | 9/2017 | Benjey | ................. | B60L 53/53 |
| 9,809,186 B2 * | 11/2017 | Hoshinoya | ................. | B60K 7/0007 |
| 9,845,856 B2 * | 12/2017 | Gutteridge | ................. | B60K 17/28 |
| 9,878,616 B2 * | 1/2018 | Dalum | ................. | B60K 25/00 |
| 9,878,748 B2 * | 1/2018 | Hellholm | ................. | B62D 55/084 |
| 9,919,578 B2 * | 3/2018 | Yan | ................. | F16H 7/02 |
| 9,933,066 B2 * | 4/2018 | Sada | ................. | F16H 57/04 |
| 10,099,552 B2 * | 10/2018 | Long | ................. | F16H 57/082 |
| 10,106,027 B1 * | 10/2018 | Keller | ................. | B60K 1/02 |
| 10,202,032 B2 * | 2/2019 | Faget | ................. | F02N 15/02 |
| 10,207,576 B2 * | 2/2019 | Makino | ................. | B60K 17/046 |
| 10,239,534 B2 * | 3/2019 | Amigo | ................. | B60K 17/22 |
| 10,358,040 B1 * | 7/2019 | Keller | ................. | B60K 11/02 |
| 10,458,533 B2 * | 10/2019 | Ono | ................. | F16H 57/0476 |
| 10,539,224 B2 * | 1/2020 | Hori | ................. | F16H 57/0456 |
| 10,563,761 B2 * | 2/2020 | Daiyakuji | ................. | F16H 47/02 |
| 10,690,234 B1 * | 6/2020 | Oury, Jr. | ................. | B60K 11/02 |
| 10,738,878 B2 * | 8/2020 | Kiyokami | ................. | F16H 57/0441 |
| 10,744,862 B2 * | 8/2020 | Sekiguchi | ................. | B60K 25/00 |
| 10,920,871 B2 * | 2/2021 | Kita | ................. | F16H 57/0483 |
| 10,948,070 B2 * | 3/2021 | Kuhl | ................. | F16H 57/0476 |
| 10,974,724 B1 * | 4/2021 | Shively | ................. | B60K 6/365 |
| 10,989,297 B2 * | 4/2021 | Guarino | ................. | F16H 57/0471 |
| 10,998,796 B2 * | 5/2021 | Ikemoto | ................. | H02K 5/203 |
| 11,054,018 B2 * | 7/2021 | Hori | ................. | F16H 57/0434 |
| 11,084,369 B2 * | 8/2021 | Watt | ................. | B60K 6/405 |
| 11,192,444 B2 * | 12/2021 | Hashimoto | ................. | B60W 10/30 |
| 11,287,026 B2 * | 3/2022 | Umeki | ................. | B60K 6/445 |
| 11,300,036 B2 * | 4/2022 | Goto | ................. | F01P 7/048 |
| 11,353,103 B2 * | 6/2022 | Kawanishi | ................. | H02K 7/116 |
| 11,415,028 B2 * | 8/2022 | Hori | ................. | B60W 10/04 |
| 11,541,749 B2 * | 1/2023 | Nishizawa | ................. | B60K 17/24 |
| 11,578,798 B2 * | 2/2023 | Nakata | ................. | F16H 57/0483 |
| 11,754,169 B1 * | 9/2023 | Guarino | ................. | F16H 57/0424 74/467 |
| 2006/0059879 A1 * | 3/2006 | Edmond | ................. | A01D 34/78 56/6 |
| 2006/0076193 A1 * | 4/2006 | Ruther | ................. | F16H 57/0456 184/6.12 |
| 2008/0152517 A1 * | 6/2008 | Ishii | ................. | B60K 17/10 417/423.5 |
| 2011/0190083 A1 * | 8/2011 | Harrison, III | ............ | F16H 7/02 474/101 |
| 2014/0155214 A1 * | 6/2014 | Kimura | ................. | F16H 57/045 475/160 |
| 2014/0158467 A1 * | 6/2014 | Kimura | ................. | F01M 5/002 184/6 |
| 2016/0129786 A1 * | 5/2016 | Petersen | ................. | B60K 17/28 192/85.01 |
| 2016/0207519 A1 * | 7/2016 | Hata | ................. | B60W 10/30 |
| 2018/0106357 A1 * | 4/2018 | Kawakami | ......... | F16H 57/0423 |
| 2018/0106359 A1 * | 4/2018 | Kawakami | ......... | F16H 57/0423 |
| 2018/0274660 A1 * | 9/2018 | Kita | ................. | F16H 57/0445 |
| 2018/0334025 A1 * | 11/2018 | Hashimoto | ................. | B60K 1/02 |
| 2019/0285165 A1 | 9/2019 | Hashimoto et al. | | |
| 2022/0234434 A1 * | 7/2022 | Tottori | ................. | B60L 58/26 |
| 2022/0377959 A1 * | 12/2022 | Nakayama | ................. | B60K 17/28 |

\* cited by examiner

LUBRICATION STRUCTURE FOR VEHICLE

CROSS-REFERENCE TO RELATED APPLICATION

This application claims priority to Japanese Patent Application No. 2021-184404 filed on Nov. 11, 2021, incorporated herein by reference in its entirety.

BACKGROUND

1. Technical Field

The present disclosure relates to a lubrication structure for a vehicle, and in particular to a lubrication structure for supplying lubricating oil to a rotary machine and a bearing member through separate pipes.

2. Description of Related Art

A lubrication structure for a vehicle is known, which includes a first lubrication pipe through which lubricating oil is supplied to a rotary machine disposed in a case, a second lubrication pipe through which lubricating oil is supplied to a bearing member disposed in the case, and an oil pump that supplies lubricating oil to the first lubrication pipe and the second lubrication pipe. For example, Japanese Unexamined Patent Application Publication No. 2019-162927 (JP 2019-162927 A) proposes a lubrication structure related to (a) a hybrid electric vehicle that includes an engine [engine 10], a power transfer device that transfers a drive force transferred from the engine to drive wheels via an output portion [differential 24 etc.], and a travel rotary machine [second electric motor MG2] coupled to the output portion, the lubrication structure including (b) a case [case 60] that houses the power transfer device and the travel rotary machine therein, (c) an I/P pump [input shaft MOP 51] mechanically rotationally driven by the engine to discharge lubricating oil, (d) an O/P pump [output shaft MOP 52] coupled to the output portion and mechanically rotationally driven to discharge lubricating oil, (e) an I/P oil path [first oil path 71] connected to the discharge side of the I/P pump to supply lubricating oil to the travel rotary machine, and (f) an O/P oil path [second oil path 72] connected to the discharge side of the O/P pump to supply lubricating oil to the power transfer device [speed reduction unit 56 etc.]. The I/P oil path is constituted using a first lubrication pipe as necessary. The O/P oil path is constituted using a second lubrication pipe as necessary. Bearing members at various portions are supplied with lubricating oil mainly from the O/P oil path. Meanwhile, Japanese Unexamined Patent Application Publication No. 2014-119085 (JP 2014-119085 A) describes a lubrication structure that supplies lubricating oil splashed up by a final gear to portions to be lubricated such as a planetary gear device via an oil guide member and an oil gutter.
The term "lubrication" as used herein is used not only when it is intended to reduce friction or wear but also when lubricating oil is supplied to a rotary machine etc. to cool the rotary machine etc.

SUMMARY

Even with such a lubrication structure for a vehicle, however, the amount of lubricating oil to be supplied to bearing members may be insufficient to cause a seizure when the viscosity of the lubricating oil is high in environments at extremely low temperatures. In particular with the lubrication structure according to JP 2014-119085 A in a form of splash-up lubrication, and also with the lubrication structure according to JP 2019-162927 A in a form of forced lubrication in which lubricating oil is supplied using an oil pump, the amount of oil to be supplied to bearing members etc. may be insufficient at extremely low temperatures, since the lubrication structures are designed such that an excessive amount of lubricating oil is not supplied from the viewpoint of the power transfer efficiency.

The present disclosure allows lubricating oil to be stably supplied to a bearing member even in environments at extremely low temperatures with a simple configuration when lubricating oil is supplied to a rotary machine and the bearing member from separate pipes.

An aspect of the present disclosure provides a lubrication structure for a vehicle including: a first lubrication pipe through which lubricating oil is supplied to a rotary machine disposed in a case; a second lubrication pipe through which the lubricating oil is supplied to a bearing member disposed in the case; and an oil pump that supplies the lubricating oil to the first lubrication pipe and the second lubrication pipe. The lubrication structure includes (a) a first oil hole provided in the case to supply the lubricating oil to the rotary machine, the first lubrication pipe being connected to the first oil hole, and (b) a second oil hole provided in the case to supply the lubricating oil to the bearing member, the lubricating oil flowing into the second oil hole from the second lubrication pipe, and (c) a connection portion between the first lubrication pipe and the first oil hole is located at a position above an opening portion of the second oil hole such that at least a part of the lubricating oil that has flowed out from the connection portion flows into the second oil hole.

In such a lubrication structure for a vehicle, the connection portion between the first lubrication pipe through which lubricating oil is supplied to the rotary machine and the first oil hole is located at a position above the opening portion of the second oil hole into which lubricating oil flows from the second lubrication pipe through which lubricating oil is supplied to the bearing member such that at least a part of the lubricating oil that has flowed out from the connection portion flows into the second oil hole. Therefore, it is possible to suppress a shortage in the amount of lubricating oil to be supplied to the bearing member at extremely low temperatures at which the viscosity of the lubricating oil is high. It is only necessary to allow lubricating oil to flow out from the connection portion between the first lubrication pipe and the first oil hole, and to provide the opening portion of the first oil hole at a position above the opening portion of the second oil hole. Such a structure can be implemented easily without requiring a significant design change, and can be constituted inexpensively compared to a case in which the oil pump that supplies lubricating oil to the second lubrication pipe is increased in size such that a sufficient amount of lubricating oil is supplied to the bearing member even at extremely low temperatures.

In the lubrication structure according to the above aspect, the first lubrication pipe may be loosely fitted in the first oil hole with a predetermined gap without interposing a seal member such as an O-ring at the connection portion such that the lubricating oil leaks out and flows downward from the connection portion even at an extremely low temperature at which a viscosity of the lubricating oil is high.

It is only necessary to loosely fit the first lubrication pipe in the first oil hole with a predetermined gap without interposing a seal member such as an O-ring such that the lubricating oil leaks out and flows downward from the connection portion between the first lubrication pipe and the first oil hole. Such a structure can be implemented easily and inexpensively.

In the lubrication structure according to the above aspect, a V-shaped or U-shaped oil receiver that opens upward and becomes wider upward may be provided at the opening portion of the second oil hole, and the connection portion may be positioned such that at least a part of the connection portion overlaps the oil receiver in a vertical direction.

The V-shaped or U-shaped oil receiver is provided at the opening portion of the second oil hole, and the connection portion is positioned such that at least a part of the connection portion overlaps the oil receiver in the vertical direction. Therefore, at least a part of the lubricating oil that has flowed downward from the connection portion is received by the oil receiver and allowed to reliably flow into the second oil hole, which appropriately suppresses a shortage in the amount of lubricating oil to be supplied to the bearing member.

In the lubrication structure according to the above aspect, (a) the vehicle may be a hybrid electric vehicle that includes an engine, a power transfer device that transfers a drive force transferred from the engine to drive wheels via an output portion, and a travel rotary machine coupled to the output portion; (b) the power transfer device and the travel rotary machine may be housed in the case, the travel rotary machine may be the rotary machine, the bearing member may be provided to support a predetermined rotary element of any of the power transfer device and the rotary machine, and (c) the one or more oil pumps may include an I/P (an abbreviation of "IN/PUT") pump mechanically rotationally driven by the engine to discharge the lubricating oil and an O/P (an abbreviation of "OUT/PUT") pump coupled to the output portion and mechanically rotationally driven to discharge the lubricating oil; and (d) the lubricating oil may be supplied from the I/P pump to the first lubrication pipe and used to cool a stator of the travel rotary machine, and the lubricating oil may be supplied from the O/P pump to the second lubrication pipe and used to lubricate the bearing member.

When the lubrication structure is for a hybrid electric vehicle, and includes an I/P pump mechanically rotationally driven by the engine and an O/P pump coupled to the output portion and mechanically rotationally driven, the lubricating oil is supplied from the I/P pump to the first lubrication pipe, and the lubricating oil is supplied from the O/P pump to the second lubrication pipe. In this case, a part of the lubricating oil discharged from the I/P pump is caused to flow into the second oil hole and to be supplied to the bearing member, which makes it possible to suppress a shortage in the amount of lubricating oil to be supplied to the bearing member at extremely low temperatures without increasing the O/P pump in size. Additionally, the amount of lubricating oil to be supplied from the second lubrication pipe to the bearing member is decreased with the discharge amount of the O/P pump reduced at low vehicle speeds. However, a part of the lubricating oil supplied from the I/P pump to the first lubrication pipe flows out from the connection portion with the first oil hole and flows into the second oil hole, which also suppresses a shortage in the amount of lubricating oil to be supplied to the bearing member at low vehicle speeds.

In the lubrication structure according to the above aspect, a discharge capacity of the I/P pump may be larger than a discharge capacity of the O/P pump. The discharge capacity is the amount of lubricating oil to be discharged per rotation.

When the discharge capacity of the I/P pump is larger than the discharge capacity of the O/P pump, the I/P pump with a larger discharge capacity is less affected by the viscosity of the lubricating oil. Therefore, a sufficient amount of lubricating oil can be supplied to the travel rotary machine to appropriately cool the travel rotary machine even at extremely low temperatures at which the viscosity of the lubricating oil is high. In addition, a part of the lubricating oil is caused to flow into the second oil hole to be supplied to the bearing member, which appropriately provides the effect of suppressing a shortage in the amount of lubricating oil to be supplied to the bearing member without increasing the O/P pump in size.

In the lubrication structure according to the above aspect, the opening portion of the second oil hole may be located off a position directly below the connection portion, and an oil guide in an inclined gutter shape may be provided directly below the connection portion to guide at least a part of the lubricating oil that has flowed out from the connection portion into the second oil hole.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The present disclosure is applicable to a variety of vehicles that include a first lubrication pipe through which lubricating oil is supplied to a rotary machine, a second lubrication pipe through which lubricating oil is supplied to a bearing member, and an oil pump. The rotary machine is a motor generator that has the function of an electric motor or an electric generator, or both functions. That is, the present disclosure is applicable to lubrication structures for a variety of vehicles such as an engine driven vehicle that includes an engine (internal combustion engine) as a drive force source, a hybrid electric vehicle of a parallel kind or a series kind that includes an engine and a rotary machine, and a battery electric vehicle that travels by driving an electric motor using power from a power source such as a battery. While the first lubrication pipe through which lubricating oil is supplied to the rotary machine is configured to, for example, cool the rotary machine by supplying lubricating oil to a stator of the rotary machine, the first lubrication pipe may be a pipe for supplying lubricating oil to a rotor shaft of the rotary machine or a bearing member for the rotor shaft. The second lubrication pipe allows lubricating oil to be supplied to a portion that is different from the first lubrication pipe. When the first lubrication pipe allows lubricating oil to be supplied to the bearing member for the rotor shaft, the second lubrication pipe is configured to allow lubricating oil to be supplied to a bearing member for a rotary element that is different from the rotor shaft. The bearing member may be a sliding bearing, a thrust bearing, etc., besides a rolling bearing that supports rotation about an axial center such as a ball bearing and a roller bearing.

The oil pump is provided separately for each of the first lubrication pipe and the second lubrication pipe, for example. However, the oil pump may be provided in a manner that lubricating oil discharged from a single, common oil pump is divided to be supplied to the first lubrication pipe and the second lubrication pipe. The oil pump may be a mechanical oil pump mechanically rotationally driven by the engine, a predetermined rotary member in a power transfer path, etc., or may be an electric oil pump rotationally driven by a dedicated electric motor. When a plurality of oil pumps is provided as the oil pump, the respective discharge capacities of such oil pumps may be different from or equal to each other.

To allow lubricating oil to flow out from a connection portion between the first lubrication pipe and the first oil hole, it is only necessary to loosely fit the first lubrication pipe in an opening portion of the first oil hole without interposing a seal member such as an O-ring with a gap (play) provided between the first lubrication pipe and the first oil hole, for example. However, a cutout, a groove, a through hole, etc. may be provided at or in the vicinity of the connection portion in order to allow lubricating oil to flow out at a predetermined flow rate. The connection between the first lubrication pipe and the first oil hole is suitably made through fitting, for example, but may also be made through screwing, butt joining, etc. A V-shaped or U-shaped oil receiver that opens upward and becomes wider upward, for example, is provided at an opening portion of a second oil hole. The connection portion between the first lubrication pipe and the first oil hole is positioned such that at least a part of the connection portion overlaps the oil receiver in the vertical direction. However, the opening portion of the second oil hole may be provided at a position displaced in a horizontal direction from a position vertically below the connection portion between the first lubrication pipe and the first oil hole, and an oil guide in a gutter shape may be provided on a wall surface of a case etc. to receive lubricating oil that has flowed out and flowed downward from the connection portion and guide the lubricating oil to the opening portion of the second oil hole.

Embodiments of the present disclosure will be described in detail below with reference to the drawings. The drawings for the following embodiments are simplified or deformed as appropriate for illustration, and the dimensional ratios, shapes, etc. of the various portions are not necessarily accurate.

Figure 1:
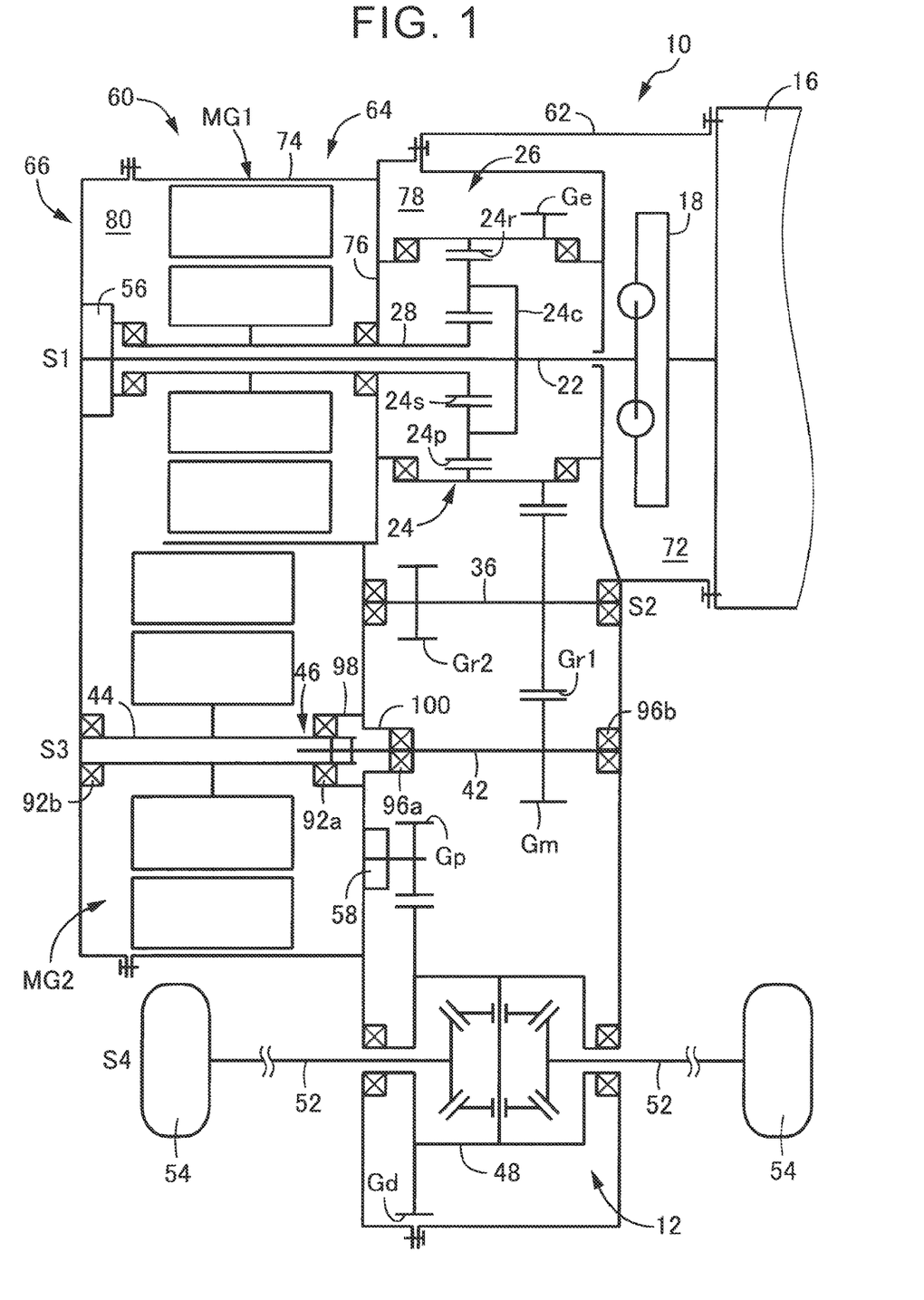
FIG. 1 is a schematic diagram illustrating a hybrid electric vehicle with a lubrication structure to which the present disclosure is applied, and is a development view in which a plurality of axes of a power transfer device is illustrated to be positioned in a common plane.

FIG. 1 is a schematic diagram illustrating a power transfer device 12 of a hybrid electric vehicle 10 (hereinafter simply referred to as a "vehicle 10") that includes a vehicle lubrication system 120 (see FIG. 2) as a lubrication structure according to an embodiment of the present disclosure, and is a development view in which a plurality of axes that constitutes the power transfer device 12 is illustrated to be positioned in a common plane. The power transfer device 12 is a transaxle of a transversely mounted kind for front-engine front-wheel-drive (FF) vehicles etc. in which a plurality of axes is disposed along the vehicle width direction, and includes a first axis S1 to a fourth axis S4 that are substantially parallel to the vehicle width direction, that is, substantially horizontal. An input shaft 22 coupled to an engine 16 via a damper device 18 is provided on the first axis S1. A single-pinion planetary gear device 24 and a first rotary machine MG1 are disposed coaxially with the first axis S1. The planetary gear device 24 and the first rotary machine MG1 function as an electric differential unit 26. The input shaft 22 is coupled to a carrier 24c of the planetary gear device 24 which is a differential mechanism. A rotor shaft 28 of the first rotary machine MG1 is coupled to a sun gear 24s. An engine output gear Ge is provided on a ring gear 24r. The sun gear 24s and the ring gear 24r are meshed with a plurality of pinions 24p rotatably disposed on the carrier 24c.

The first rotary machine MG1 is a motor generator that is selectively used as one of an electric motor and an electric generator, and corresponds to a rotary machine for differential control. By continuously controlling the rotational speed of the sun gear 24s in regeneration control etc. in which the first rotary machine MG1 functions as an electric generator, rotation of the engine 16 is output from the engine output gear Ge with the rotational speed of the engine 16 continuously varied. That is, the electric differential unit 26 can be considered as an electric continuously variable transmission that can continuously vary a gear ratio γ (=engine rotational speed Ne/output rotational speed Nout). The engine rotational speed Ne is the rotational speed of the engine 16. The output rotational speed Nout is the rotational speed of the engine output gear Ge. Consequently, the electric differential unit 26 can cause the engine 16 to operate at a certain optimal fuel efficiency operating point, that is, an engine rotational speed Ne and engine torque Te, at which the fuel efficiency of the engine 16 is at its best, for example, irrespective of variations in the output rotational speed Nout corresponding to a vehicle speed V. When torque of the first rotary machine MG1 is brought to zero and the sun gear 24s is caused to run idle, the output from the engine 16 is blocked, and rotation of the engine 16 in an accompanying manner during motor travel, coasting, etc is restrained. The engine 16 is an internal combustion engine such as a gasoline engine or a diesel engine that generates power by combusting fuel, and is used as a drive force source for travel. The input shaft 22 is inserted through the center of the shaft of the first rotary machine MG1 to be coupled to an I/P pump 56. The I/P pump 56 is mechanically rotationally driven by the engine 16. The I/P pump 56 is a mechanical oil pump mechanically rotationally driven by the engine 16.

A counter shaft 36 on which a large speed reduction gear Gr1 and a small speed reduction gear Gr2 are provided is rotatably disposed on the second axis S2. The large speed reduction gear Gr1 is meshed with the engine output gear Ge. The large speed reduction gear Gr1 is also meshed with a motor output gear Gm disposed on the third axis S3. The motor output gear Gm is provided on a gear shaft 42. The gear shaft 42 is coupled to a rotor shaft 44 of the second rotary machine MG2 that is disposed coaxially with the third axis S3 via a spline fitting portion 46 so as to be able to transfer power to rotor shaft 44. The second rotary machine MG2 is a motor generator that is selectively used as one of an electric motor and an electric generator, and is used as a drive force source for traveling when the second rotary machine MG2 is subjected to power running control so as to function as an electric motor. The second rotary machine MG2 corresponds to a travel rotary machine. The vehicle 10 is a hybrid electric vehicle of a multi-axis parallel kind in which the second rotary machine MG2 is disposed on the third axis S3 that is different from the first axis S1 on which the engine 16 and the electric differential unit 26 are disposed.

Figure 4:
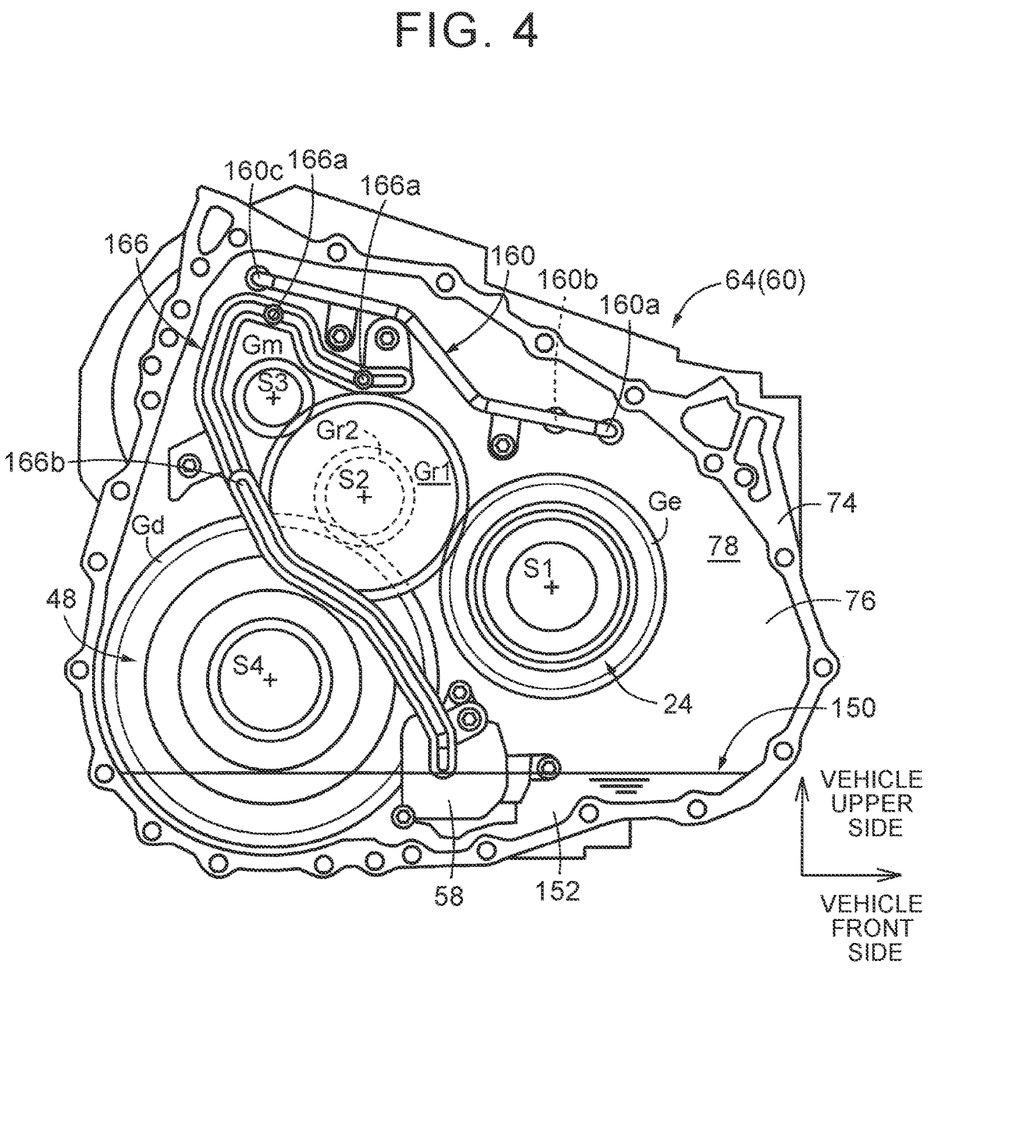
FIG. 4 is a front view illustrating a state in which an I/P oil pipe and an O/P oil pipe that constitute oil paths of the vehicle lubrication system in FIG. 2 are attached to a partition wall of the transaxle case.

The small speed reduction gear Gr2 is meshed with a differential ring gear Gd of a differential device 48 disposed on the fourth axis S4. A drive force from the engine 16 and the second rotary machine MG2 is distributed to right and left drive shafts 52 via the differential device 48 to be transferred to right and left drive wheels 54. As illustrated in FIG. 4, the fourth axis S4 is located at the lowest position in the vehicle, among the first axis S1 to the fourth axis S4, the second axis S2 and the third axis S3 are located above the fourth axis S4, and the first axis S1 is located obliquely above the fourth axis S4 on the front side in the vehicle. The third axis S3 on which the second rotary machine MG2 and the gear shaft 42 are disposed is located at the highest position in the vehicle, among the first axis S1 to the fourth axis S4.

The differential ring gear Gd is also meshed with a pump drive gear Gp. The O/P pump 58 is mechanically rotationally driven in conjunction with the differential ring gear Gd, or in other words in conjunction with the drive wheels 54. That is, the O/P pump 58 is a mechanical oil pump meshed with the differential ring gear Gd which is an output portion and rotationally driven, to discharge lubricating oil in a discharge amount corresponding to the vehicle speed V, and discharges a larger amount of lubricating oil as the vehicle speed V is raised. The O/P pump 58 may be rotationally driven with the pump drive gear Gp meshed with a different output portion such as the large speed reduction gear Gr1 or the small speed reduction gear Gr2 that is rotated in conjunction with the differential ring gear Gd.

The power transfer device 12 includes a transaxle case 60 (hereinafter simply referred to as a "case 60") integrally fixed to the engine 16 and supported by a vehicle body via a bracket etc. The case 60 is constituted from three case members, namely a front case member 62, an intermediate case member 64, and a rear cover 66 that are integrally joined to each other by a large number of fastening bolts with butting portions such as flanges provided at axial end portions of such members butted against each other. The front case member 62 has an opening portion that opens toward the engine 16 and that is integrally fixed to the engine 16. A first housing space 72 is formed between the engine 16 and the front case member 62 to house the damper device 18. The intermediate case member 64 integrally includes an outer tube 74 in a tubular shape and a partition wall 76 provided to extend generally orthogonally to the first axis S1 to the fourth axis S4 so as to extend toward the inner peripheral side from the outer tube 74. A second housing space 78 is formed between the front case member 62 and the partition wall 76 to house the power transfer device 12 such as the electric differential unit 26, the counter shaft 36, the gear shaft 42, and the differential device 48. The front case member 62 and the partition wall 76 include a support portion that rotatably supports the engine output gear Ge, the counter shaft 36, the gear shaft 42, the differential device 48, etc. via bearing members such as bearings. A third housing space 80 is formed between the rear cover 66 and the partition wall 76 to house the first rotary machine MG1 and the second rotary machine MG2. The rear cover 66 and the partition wall 76 include a support portion that rotatably supports the rotor shafts 28 and 44 via bearing members such as bearings. The first housing space 72, the second housing space 78, and the third housing space 80 can also be expressed as a damper chamber, a gear chamber, and a motor chamber, respectively.

The vehicle 10 that includes the power transfer device 12 enables a battery electric vehicle (BEV) travel mode in which the vehicle 10 travels using only the second rotary machine MG2 as a drive force source with the engine 16 stationary, and a hybrid electric vehicle (HEV) travel mode in which the vehicle 10 travels using at least the engine 16 as a drive force source. In the HEV travel mode, the vehicle can travel using both the engine 16 and the second rotary machine MG2 as drive force sources by controlling the second rotary machine MG2 so as to perform power running as necessary.

Figure 2:
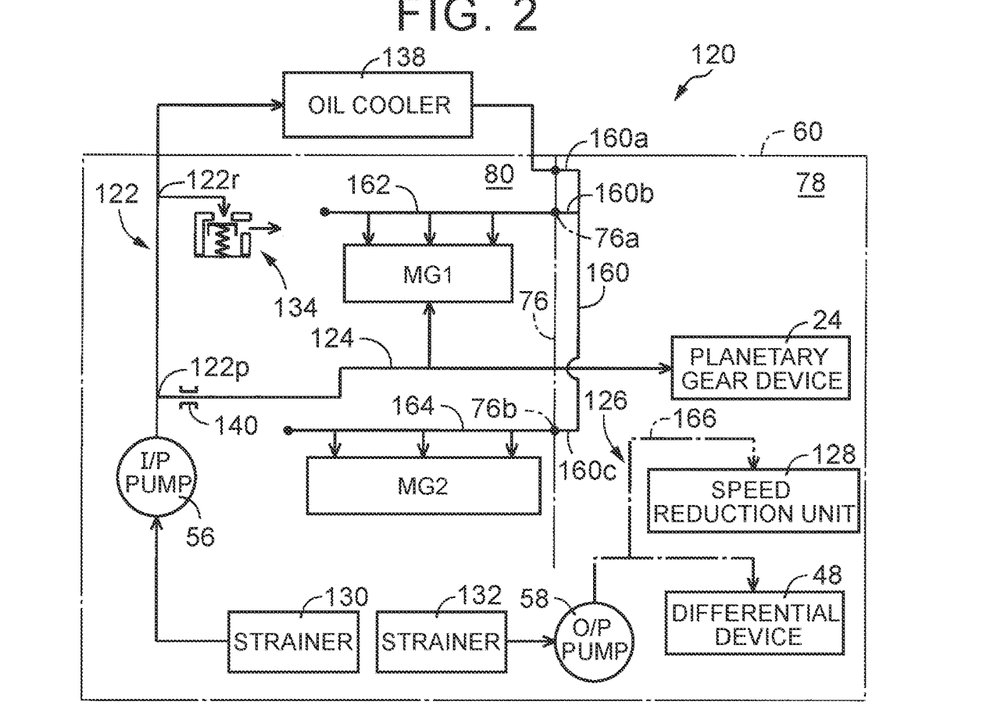
FIG. 2 is a block diagram illustrating a vehicle lubrication system provided in the hybrid electric vehicle in FIG. 1 as the lubrication structure.
Figure 3:
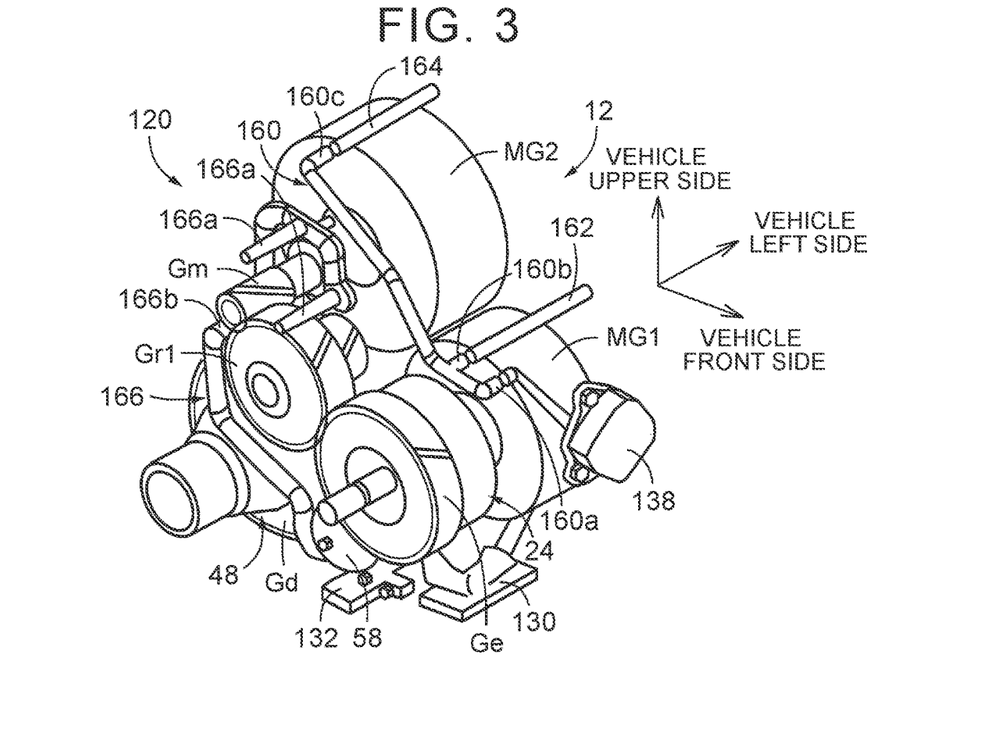
FIG. 3 is a perspective view of the power transfer device specifically illustrating the vehicle lubrication system in FIG. 2, in which a transaxle case is omitted.

FIG. 2 is a block diagram of the vehicle lubrication system 120 of the vehicle 10. FIG. 3 is a perspective view of the power transfer device 12 specifically illustrating the vehicle lubrication system 120, in which the case 60 is omitted. FIG. 4 is a front view illustrating a state in which an I/P oil pipe 160 and an O/P oil pipe 166 that constitute oil paths of the vehicle lubrication system 120 are attached to the case 60, illustrating the partition wall 76 of the intermediate case member 64 as seen from the second housing space 78 side. The vehicle lubrication system 120 includes the I/P pump 56 and the O/P pump 58 as suction devices, and lubricates the rotary machines MG1 and MG2 and various portions of the power transfer device 12 in a distributed manner via an I/P oil path 122 indicated by the solid line and an O/P oil path 126 indicated by the long dashed short dashed line in FIG. 2. The I/P pump 56 and the O/P pump 58 suck lubricating oil 152 from an oil storage portion 150 (see FIG. 4) provided at the bottom portion of the case 60 via strainers 130 and 132, respectively, and output the lubricating oil 152 to the I/P oil path 122 and the O/P oil path 126, respectively. While separate strainers 130 and 132 are provided in the present embodiment, the I/P pump 56 and the O/P pump 58 may be configured to suck the lubricating oil 152 through a common strainer.

The O/P pump 58 is coupled to the differential device 48 to be mechanically rotationally driven, and therefore can be rotationally driven to suck the lubricating oil 152 in an amount that matches the vehicle speed V and supply the lubricating oil 152 to the various portions even in the BEV travel mode in which rotation of the engine 16 is stopped. The engine 16 that rotationally drives the I/P pump 56 can drive the I/P pump 56 even when the vehicle is stationary, and therefore the I/P pump 56 can suction the lubricating oil 152 in an amount that does not depend on the vehicle speed V, including when the vehicle is stationary, and supply the lubricating oil 152 to portions to be lubricated. In the BEV travel mode, however, operation of the I/P pump 56 is also stopped as rotation of the engine 16 is stopped. While the lubricating oil 152 discharged from the I/P pump 56 is mainly used to cool the rotary machines MG1 and MG2, the lubricating oil 152 discharged from the O/P pump 58 is used to lubricate gear meshing portions and bearing members at various portions of the power transfer device 12. In the present embodiment, a large pump with a larger discharge capacity than that of the O/P pump 58 is used as the I/P pump 56 such that a stable performance to cool the rotary machines MG1 and MG2 can be obtained.

Figure 8:
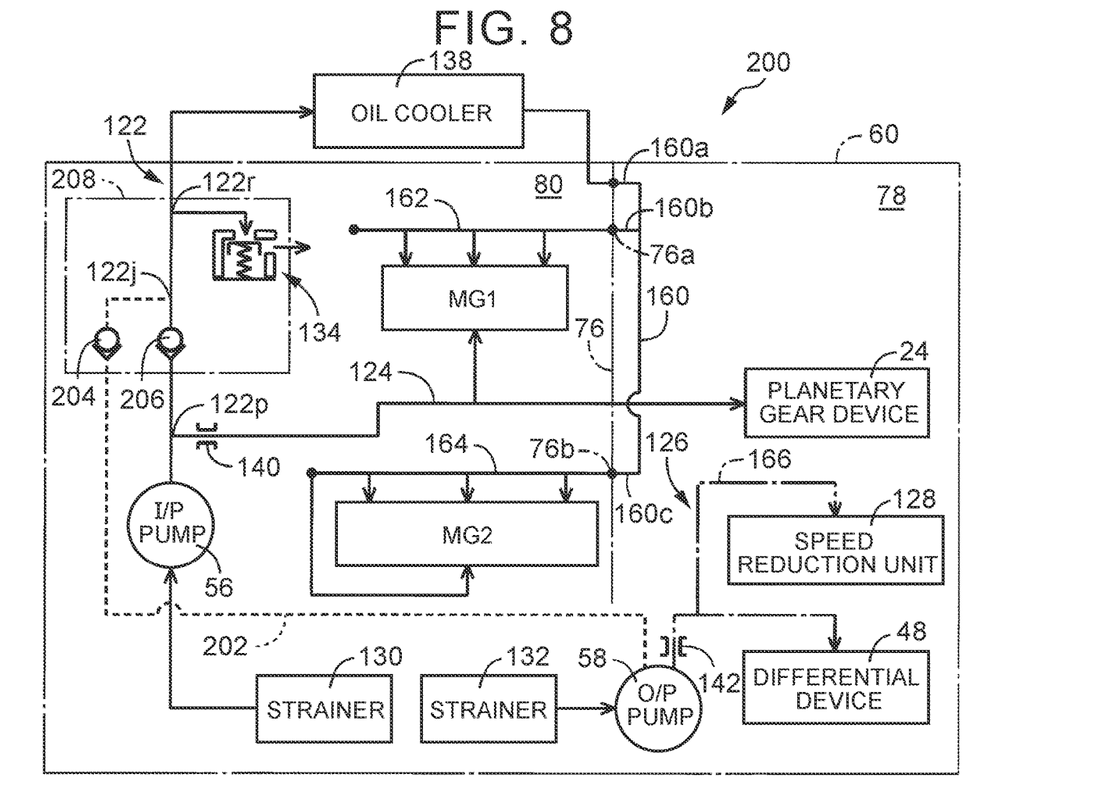
FIG. 8 is a block diagram of a vehicle lubrication system corresponding to FIG. 2, illustrating still another embodiment of the present disclosure.

The I/P oil path 122 is connected to the discharge side of the I/P pump 56 to supply the lubricating oil 152 to the rotary machines MG1 and MG2. In FIG. 2 and FIG. 8 that illustrates another embodiment, the downward arrows pointing to the rotary machines MG1 and MG2 mean that the lubricating oil 152 flows downward from above the rotary machines MG1 and MG2 to cool the stators etc. Meanwhile, the upward arrows pointing to the rotary machines MG1 and MG2 mean that the lubricating oil 152 is supplied from the center side of the rotary machines MG1 and MG2 to cool and lubricate the rotors, the bearings, etc. The lubricating oil 152 is discharged from oil holes provided at the centers of the shaft of the input shaft 22, the rotor shafts 28 and 44, etc. A relief valve (escape valve) 134 is coupled to the I/P oil path 122 at a relief position 122r that is an intermediate position before reaching the rotary machines MG1 and MG2, which suppresses the hydraulic pressure in the I/P oil path 122 becoming excessively high. An oil cooler 138 is provided on the rotary machines MG1 and MG2 side with respect to the relief position 122r at which the relief valve 134 is coupled. The lubricating oil 152 cooled by the oil cooler 138 is supplied to the rotary machines MG1 and MG2. The oil cooler 138 is a water-cooled cooler that cools the lubricating oil 152 through water cooling in the present embodiment, and is disposed outside the case 60 to cool the lubricating oil 152 through heat exchange with a refrigerant in a refrigerant circulation circuit (not illustrated). The refrigerant circulation circuit circulates a refrigerant such as a coolant, and includes a radiator that cools the refrigerant using outside air, a refrigerant pump, etc.

The I/P oil path 122 supplies the lubricating oil 152 to predetermined portions to be lubricated through an oil hole provided in a side wall etc. of the case 60, a pipe that is separate from the case 60, etc. In the present embodiment, an I/P oil pipe 160 disposed in the second housing space 78 and an MG1 oil pipe 162 and an MG2 oil pipe 164 disposed in the third housing space 80 are provided as the pipe that is separate from the case 60. The oil pipes 160, 162, and 164 are each a resin pipe. The I/P oil pipe 160 is disposed along the partition wall 76 of the intermediate case member 64, and fixed to the partition wall 76 at a plurality of locations. The I/P oil pipe 160 includes three connection parts 160a to 160c. The lubricating oil 152 is supplied from the oil cooler 138 to the I/P oil pipe 160 via the connection part 160a. The connection parts 160b and 160c are coupled to communication oil holes 76a and 76b (see FIG. 2), respectively, provided in the partition wall 76. The lubricating oil 152 is supplied to the MG1 oil pipe 162 and the MG2 oil pipe 164 in the third housing space 80 via the communication oil holes 76a and 76b, respectively. The MG1 oil pipe 162 and the MG2 oil pipe 164 are each a straight pipe disposed above the first rotary machine MG1 and the second rotary machine MG2, respectively, generally in parallel with the axes S1 and S3 thereof. The lubricating oil 152 is supplied to the MG1 oil pipe 162 and the MG2 oil pipe 164 with first end portions thereof in the longitudinal direction connected to the communication oil holes 76a and 76b, respectively, in the partition wall 76. The MG1 oil pipe 162 and the MG2 oil pipe 164 are provided with discharge holes directed downward at a plurality of locations separated from each other in the longitudinal direction. The lubricating oil 152 supplied from the I/P oil pipe 160 is discharged downward from the discharge holes to be sprayed to cool the outer peripheral surfaces of the stators of the first rotary machine MG1 and the second rotary machine MG2.

The I/P oil path 122 includes a branch oil path 124 branched at a branch point 122p between the relief position 122r and the I/P pump 56. The lubricating oil 152 is supplied to the first rotary machine MG1 and the planetary gear device 24 as the electric differential unit 26 via the branch oil path 124. The branch oil path 124 is provided with an orifice 140 that restricts the supply amount of the lubricating oil 152 that flows into the branch oil path 124 at the branch point 122p, which appropriately secures the amount of lubricating oil to be supplied to the oil cooler 138. The branch oil path 124 supplies the lubricating oil 152 via oil holes provided in the rotor shaft 28 of the first rotary machine MG1, the input shaft 22, etc., for example, to cool and lubricate the rotor and the bearings of the first rotary machine MG1 and lubricate gear meshing portions, bearings, etc. of the planetary gear device 24.

The O/P oil path 126 is connected to the discharge side of the O/P pump 58, and supplies the lubricating oil 152 to a speed reduction unit 128 in which the large speed reduction gear Gr1, the small speed reduction gear Gr2, the motor output gear Gm etc. are provided, the differential device 48, etc. The O/P oil path 126 supplies the lubricating oil 152 via a pipe provided separately from the case 60, an oil hole provided in the case 60, etc., for example. In the present embodiment, the O/P oil path 126 is mainly constituted of the O/P oil pipe 166 that is provided separately from the case 60 and made of a resin. The O/P oil pipe 166 is disposed in the second housing space 78, and fixed to the partition wall 76 at a plurality of locations. The lower end portion of the O/P oil pipe 166 is connected to the O/P pump 58 such that the lubricating oil 152 is supplied from the O/P pump 58 to the O/P oil pipe 166. The upper end portion of the O/P oil pipe 166 reaches a position above the large speed reduction gear Gr1, the small speed reduction gear Gr2, and the motor output gear Gm. A plurality of projecting nozzle portions 166a is provided at the position above the large speed reduction gear Gr1, the small speed reduction gear Gr2, and the motor output gear Gm to project in a direction parallel to the second axis S2 and the third axis S3. The lubricating oil 152 is discharged from the projecting nozzle portions 166a downward or in a horizontal direction such that the lubricating oil 152 is sprayed toward the large speed reduction gear Gr1, the small speed reduction gear Gr2, the motor output gear Gm, etc. to lubricate gear meshing portions, bearings, etc. thereof.

A crank portion 166b cranked in parallel with the fourth axis S4 is provided at an intermediate portion of the O/P oil pipe 166. The crank portion 166b is positioned above the differential device 48 and the differential ring gear Gd. The crank portion 166b is provided with a discharge hole to discharge the lubricating oil 152. The lubricating oil 152 lubricates the differential ring gear Gd, the differential device 48, bearings, etc. A part of the differential device 48 is immersed in the oil storage portion 150 at the lower part of the case 60 to be lubricated in an oil bath manner, and the lubricating oil 152 is splashed up along with rotation of the differential device 48 such that the lubricating oil 152 is sprayed to lubricate the various portions of the power transfer device 12.

Figure 5:
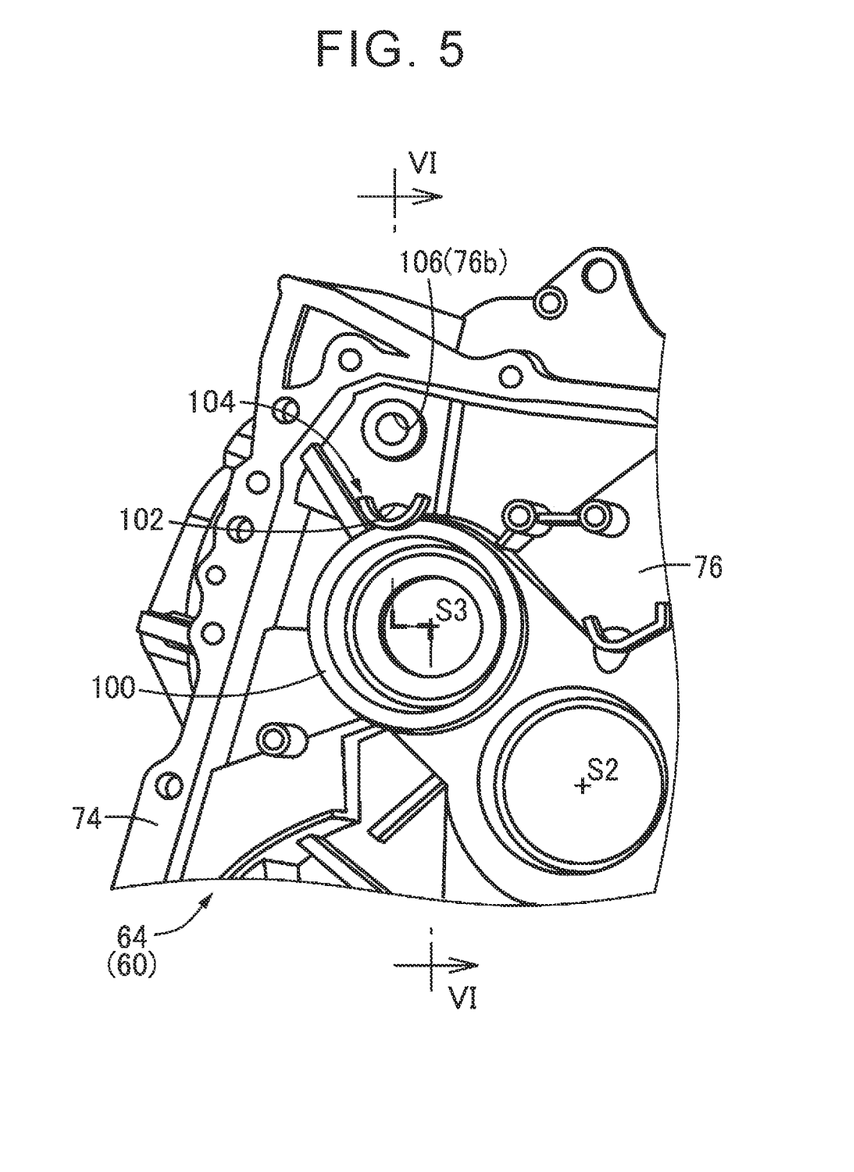
FIG. 5 is a perspective view in which a part of the transaxle case in FIG. 4, that is, the upper left portion of FIG. 4 in which the I/P oil pipe is connected to a communication oil hole, is illustrated as enlarged.
Figure 6:
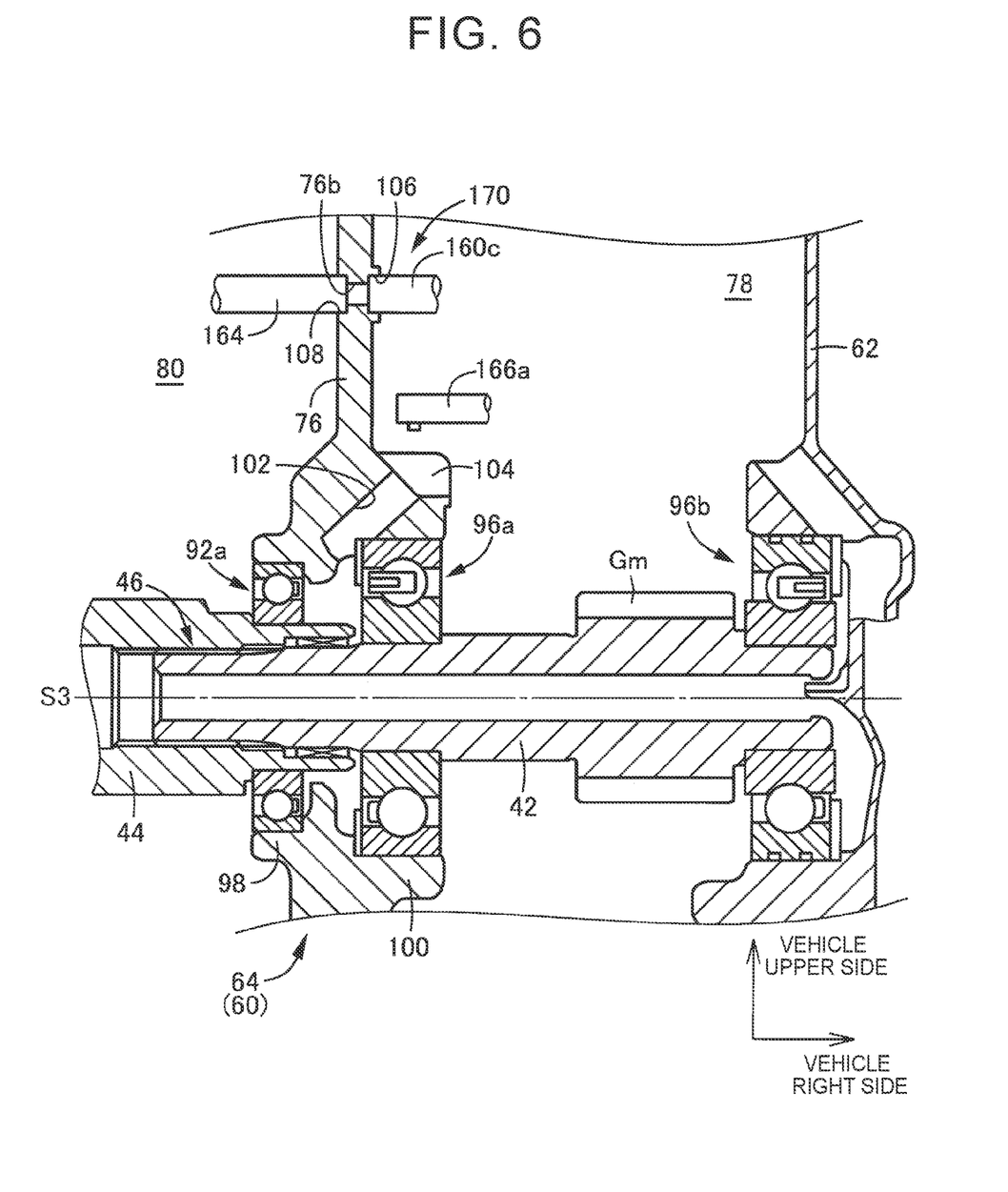
FIG. 6 is a sectional view of the power transfer device for a portion corresponding to the VI-VI sectional plane in FIG. 5, illustrating the structure of bearings for a rotor shaft and a gear shaft disposed on a third axis S3 and the connection structure of the I/P oil pipe connected at a position above the third axis S3.

FIG. 5 is a perspective view in which a part of the case 60 in FIG. 4, that is, the upper left portion of the partition wall 76 in FIG. 4, is illustrated as enlarged, illustrating the vicinity of the connection part 160c of the I/P oil pipe 160 being connected to the communication oil hole 76b in the partition wall 76. FIG. 6 is a sectional view of the power transfer device 12 for a portion corresponding to the VI-VI sectional plane in FIG. 5, illustrating the structure of bearings for the rotor shaft 44 and the gear shaft 42 disposed on the third axis S3 and the connection structure of the I/P oil pipe 160 connected at a position above the third axis S3. An end portion of the gear shaft 42 on the second rotary machine MG2 side is rendered smaller in diameter than the rotor shaft 44, and fitted into the cylinder of the rotor shaft 44 and coupled so as to be able to transfer power via a spline fitting portion 46. The rotor shaft 44 is supported by the case 60 so as to be rotatable about the third axis S3 via a pair of first bearings 92a and 92b (see FIG. 1). The first bearings 92a and 92b are disposed on both sides of the rotor of the second rotary machine MG2 in the axial direction of the rotor shaft 44. The gear shaft 42 is supported by the case 60 so as to be rotatable about the third axis S3 via a pair of second bearings 96a and 96b. The second bearings 96a and 96b are disposed on both sides of the motor output gear Gm in the axial direction of the gear shaft 42. The first bearing 92a and the second bearing 96a are each a ball bearing, and are held as disposed inside a first bearing holding portion 98 and a second bearing holding portion 100, respectively, in a cylindrical shape and provided as a support portion in the partition wall 76 of the intermediate case member 64.

In order to lubricate the first bearing 92a and the second bearing 96a, the second bearing holding portion 100 is provided with an oil introduction hole 102 that allows the lubricating oil 152 supplied from the O/P oil pipe 166 to be introduced into the second bearing holding portion 100. The oil introduction hole 102 is provided above the third axis S3 so as to penetrate the second bearing holding portion 100 in a cylindrical shape from the outer peripheral side toward the inner peripheral side, and inclined toward the first bearing holding portion 98 with respect to a direction that is orthogonal to the third axis S3 as the oil introduction hole 102 extends inward, that is, downward, from an outside opening portion on the outer peripheral surface side to open in a portion between the first bearing 92a and the second bearing 96a. The outside opening portion of the oil introduction hole 102 opens obliquely upward. An oil receiver 104 with a U-shaped or V-shaped section that becomes wider toward the upper side is provided around the opening portion. The lubricating oil 152 discharged downward from the projecting nozzle portions 166a of the O/P oil pipe 166 is received by the oil receiver 104, introduced into the oil introduction hole 102, and supplied to the portion between the first bearing 92a and the second bearing 96a. That is, one of the plurality of projecting nozzle portions 166a provided on the O/P oil pipe 166 is provided directly above the oil receiver 104 as illustrated in FIG. 6, and the lubricating oil 152 discharged from the projecting nozzle portion 166a flows into the oil introduction hole 102 via the oil receiver 104. While the oil receiver 104 is open on the distal end side (right side in FIG. 6), a side wall etc. that restricts an outflow of the lubricating oil 152 may be provided as necessary. While the oil receiver 104 is provided integrally with the partition wall 76, the oil receiver 104 may be constituted separately from the intermediate case member 64 to be retrofitted.

On the other hand, the communication oil hole 76b to which the connection part 160c of the I/P oil pipe 160 is connected is provided at a position directly above the oil receiver 104 in the vertical direction. The communication oil hole 76b couples the I/P oil pipe 160 disposed in the second housing space 78 and the MG2 oil pipe 164 disposed in the third housing space 80 to each other, and is provided in parallel with the third axis S3. Countersunk holes 106 and 108 are provided at opening portions on both sides of the communication oil hole 76b. The connection part 160c of the I/P oil pipe 160 and the MG2 oil pipe 164 are fitted with the countersunk holes 106 and 108, respectively. The MG2 oil pipe 164 is caused to abut against the bottom portion (stepped portion) of the countersunk hole 108 oil-tightly, for example, such that oil does not leak between the communication oil hole 76b and the MG2 oil pipe 164. A seal member such as an O-ring may be used as necessary. On the other hand, the connection part 160c is loosely fitted in the countersunk hole 106 with a predetermined gap at the connection portion 170 such that a predetermined amount of the lubricating oil 152 leaks out and flows downward from the connection portion 170 with the communication oil hole 76b even at extremely low temperatures (e.g. −20° C. or lower) at which the viscosity of the lubricating oil 152 is high. Specifically, the connection part 160c is fitted without using a seal member such as an O-ring such that a predetermined gap is provided between the bottom portion (stepped portion) of the countersunk hole 106 and the connection part 160c and predetermined play is provided between the inner peripheral surface of the countersunk hole 106 and the connection part 160c. At least a part of the lubricating oil 152 that has flowed out from the connection portion 170 flows downward along the partition wall 76, and is received by the oil receiver 104 and flows into the oil introduction hole 102 to be used to lubricate the first bearing 92a and the second bearing 96a. The oil receiver 104 functions as an oil guide that receives the lubricating oil 152 that has flowed out from the connection portion 170 and guides the lubricating oil 152 into the oil introduction hole 102. It is also possible to provide the connection part 160c at the connection portion 170 with a discharge hole etc., as necessary, such that a predetermined amount of the lubricating oil 152 flows out to be supplied to the oil introduction hole 102 even at extremely low temperatures.

In the embodiment, the I/P oil pipe 160 corresponds to the first lubrication pipe, the communication oil hole 76b corresponds to the first oil hole, and the second rotary machine MG2 to be cooled by lubricating oil discharged from the MG2 oil pipe 164 corresponds to the rotary machine to which the lubricating oil 152 is supplied from the first lubrication pipe by way of the first oil hole. The O/P oil pipe 166 corresponds to the second lubrication pipe, the oil introduction hole 102 corresponds to the second oil hole, and the first bearing 92a and the second bearing 96a correspond to the bearing member to be lubricated by the lubricating oil 152 supplied from the second lubrication pipe. The case 60 that has the second housing space 78 in which the I/P oil pipe 160 and the O/P oil pipe 166 are disposed corresponds to the case in which the first lubrication pipe and the second lubrication pipe are provided. That is, the bearings 92a and 96a disposed on the third axis S3 that is positioned at the highest position in the vehicle among the first axis S1 to the fourth axis S4 are not easily sufficiently lubricated by the lubricating oil 152 splashed up by rotation of the differential device 48, and are located far from the O/P pump 58. Therefore, the amount of the lubricating oil 152 supplied from the O/P oil pipe 166 alone may be insufficient when the viscosity of the lubricating oil 152 is high at low temperatures and thus the bearings 92a and 96a may be seized. Therefore, the lubricating oil 152 is made to be supplied also from the I/P oil pipe 160.

In the lubrication structure for the vehicle 10, that is, the vehicle lubrication system 120, according to the present embodiment, the connection portion 170 between the I/P oil pipe 160 through which the lubricating oil 152 is supplied to the second rotary machine MG2 and the communication oil hole 76b is located at a position above the opening portion of the oil introduction hole 102 provided in the second bearing holding portion 100 in order to supply the lubricating oil 152 discharged from the O/P oil pipe 166 to the first bearing 92a and the second bearing 96a such that at least a part of the lubricating oil 152 that has flowed out from the connection portion 170 flows into the oil introduction hole 102. Therefore, it is possible to suppress a shortage in the amount of the lubricating oil 152 to be supplied to the first bearing 92a and the second bearing 96a at extremely low temperatures at which the viscosity of the lubricating oil 152 is high.

It is only necessary to allow lubricating oil to flow out from the connection portion 170 between the I/P oil pipe 160 and the communication oil hole 76b, and to provide the communication oil hole 76b at a position above the opening portion of the oil introduction hole 102. Such a structure can be implemented easily without requiring a significant design change, and can be constituted inexpensively compared to when the O/P pump 58 is increased in size such that a sufficient amount of the lubricating oil 152 is supplied from the O/P oil pipe 166 to the first bearing 92a and the second bearing 96a even at extremely low temperatures.

It is only necessary to loosely fit the connection part 160c in the countersunk hole 106 of the communication oil hole 76b with a predetermined gap without interposing a seal member such as an O-ring such that the lubricating oil 152 leaks out and flows downward from the connection portion 170 between the connection part 160c of the I/P oil pipe 160 and the communication oil hole 76b. Such a structure can be implemented easily and inexpensively.

The oil receiver 104 is provided at the opening portion of the oil introduction hole 102, and the connection portion 170 is located at a position directly above the oil receiver 104 in the vertical direction. Therefore, at least a part of the lubricating oil 152 that has flowed downward from the connection portion 170 is received by the oil receiver 104 and allowed to reliably flow into the oil introduction hole 102, which appropriately suppresses a shortage in the amount of the lubricating oil 152 to be supplied to the first bearing 92a and the second bearing 96a.

The lubrication structure includes the I/P pump 56 mechanically rotationally driven by the engine 16 and the O/P pump 58 coupled to the differential device 48 which is an output portion and to be mechanically rotationally driven, the lubricating oil 152 is supplied from the I/P pump 56 to the I/P oil pipe 160, and the lubricating oil 152 is supplied from the O/P pump 58 to the O/P oil pipe 166. Therefore, the amount of lubricating oil to be supplied from the O/P oil pipe 166 to the first bearing 92a and the second bearing 96a is decreased with the discharge amount of the O/P pump 58 reduced at low vehicle speeds. However, a part of the lubricating oil 152 supplied from the I/P pump 56 to the I/P oil pipe 160 flows out from the connection portion 170 with the communication oil hole 76b and flows into the oil introduction hole 102, which suppresses a shortage in the amount of the lubricating oil 152 to be supplied to the first bearing 92a and the second bearing 96a at low vehicle speeds.

The discharge capacity of the I/P pump 56 is larger than the discharge capacity of the O/P pump 58, and the I/P pump 56 with a larger discharge capacity is less affected by the viscosity of the lubricating oil 152. Therefore, a sufficient amount of the lubricating oil 152 can be supplied to the second rotary machine MG2 to appropriately cool the second rotary machine MG2 even at extremely low temperatures at which the viscosity of the lubricating oil 152 is high. In addition, a part of the lubricating oil 152 is caused to flow into the oil introduction hole 102 to be supplied to the first bearing 92a and the second bearing 96a, which appropriately provides the effect of suppressing a shortage in the amount of the lubricating oil 152 to be supplied to the first bearing 92a and the second bearing 96a without increasing the O/P pump 58 in size.

Next, another embodiment of the present disclosure will be described. Portions according to the following embodiment that are substantially the same as those according to the above embodiment are given like signs to omit detailed description.

Figure 7:
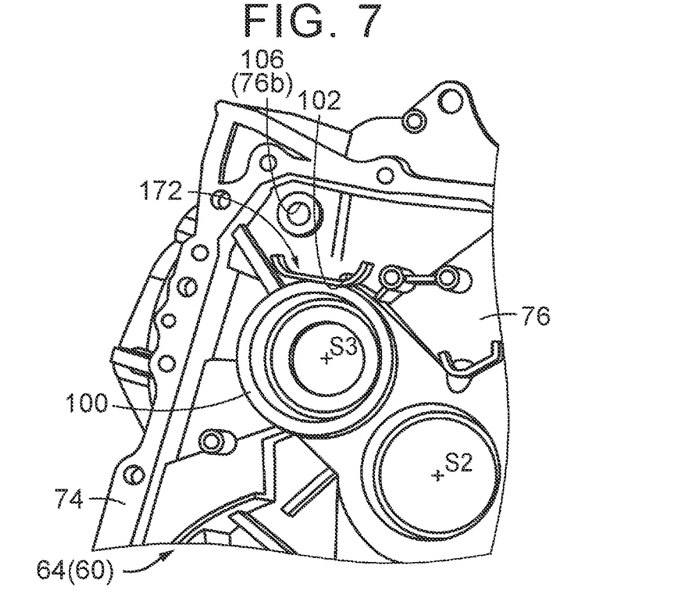
FIG. 7 is a perspective view corresponding to FIG. 5, illustrating another embodiment of the present disclosure.

FIG. 7 is a perspective view corresponding to FIG. 5, illustrating the upper left portion of the partition wall 76 at which the communication oil hole 76b to which the connection part 160c of the I/P oil pipe 160 is connected and the oil introduction hole 102 for supplying the lubricating oil 152 to the first bearing 92a and the second bearing 96a are provided. In the embodiment, the position of the outside opening portion of the oil introduction hole 102 is different from that in the above embodiment. The outside opening portion is located off a position directly below the communication oil hole 76b to which the connection part 160c is connected, and an oil guide 172 in an inclined gutter shape is provided directly below the communication oil hole 76b to guide the lubricating oil 152 that has flowed downward from the connection portion 170 between the communication oil hole 76b and the connection part 160c to the oil introduction hole 102. In this case, it is desirable that the projecting nozzle portions 166a of the O/P oil pipe 166 should be located directly above the oil introduction hole 102. However, the projecting nozzle portions 166a may be located at any position above the oil guide 172 as long as the lubricating oil 152 that has flowed downward is received by the oil guide 172. A plurality of oil introduction holes 102 may be provided. Also with the present embodiment, substantially the same effect and function as those according to the above embodiment can be obtained.

FIG. 8 is a block diagram corresponding to FIG. 2, illustrating a vehicle lubrication system 200 that includes an second O/P oil path 202 that couples the O/P pump 58 and the I/P oil path 122 to each other as indicated by the dashed line such that a part of the lubricating oil 152 discharged from the O/P pump 58 is supplied to the I/P oil path 122. While the second O/P oil path 202 is constituted of a pipe such as a resin pipe, for example, the second O/P oil path 202 may be constituted of an oil hole provided in a side wall etc. of the case 60. The second O/P oil path 202 is provided separately from the O/P oil path 126, and the O/P oil path 126 is provided with an orifice 142 that restricts the amount of lubricating oil that flows into the O/P oil path 126, which appropriately secures the amount of lubricating oil to be supplied from the second O/P oil path 202 to the I/P oil path 122.

The second O/P oil path 202 is coupled to a merge point 122j provided between the branch point 122p and the relief position 122r of the I/P oil path 122. A check valve 204 is provided before the merge point 122j to allow a flow of the lubricating oil 152 toward the merge point 122j but block a flow in the opposite direction. A check valve 206 is also provided before the merge point 122j of the I/P oil path 122 to allow a flow of the lubricating oil 152 toward the merge point 122j but block a flow in the opposite direction. Consequently, the lubricating oil 152 on the high pressure side in the I/P oil path 122 and the second O/P oil path 202 is supplied from the merge point 122j to the rotary machines MG1 and MG2 by way of the oil cooler 138. That is, when operation of the I/P pump 56 is stopped as rotation of the engine 16 is stopped in the BEV travel mode, a part of the lubricating oil 152 discharged from the O/P pump 58 is supplied from the second O/P oil path 202 to the rotary machines MG1 an MG2 by way of the I/P oil path 122. Therefore, the second rotary machine MG2 that is used as a drive force source is cooled appropriately. In other words, it is possible to improve fuel efficiency by extending the travel time in the BEV travel mode in which rotation of the engine 16 is stopped, which is suitably applied to a hybrid electric vehicle of a plug-in kind that can be charged externally. The check valves 204 and 206 can be incorporated in a common valve body 208 together with the relief valve 134, for example.

In the present embodiment, the O/P oil path 126 is provided with the orifice 142. Therefore, there is a growing fear of a shortage in the amount of lubricating oil to be supplied from the O/P oil path 126 to the first bearing 92a and the second bearing 96a at extremely low temperatures at which the viscosity of the lubricating oil 152 is high. In contrast, the lubricating oil 152 flows out from the connection portion 170 between the I/P oil pipe 160 of the I/P oil path 122 through which the lubricating oil 152 is supplied to the second rotary machine MG2 and the communication oil hole 76b, and flows into the oil introduction hole 102 to be supplied to the first bearing 92a and the second bearing 96a. Therefore, a remarkable effect of suppressing a shortage in the amount of the lubricating oil 152 to be supplied to the first bearing 92a and the second bearing 96a can be obtained without increasing the O/P pump 58 in size.

While embodiments of the present disclosure have been described in detail above, these are merely exemplary, and the present disclosure can be implemented in aspects with a variety of modifications and improvements applied based on the knowledge of a person skilled in the art.

What is claimed is:

1. A lubrication structure for a vehicle comprising:
    a first lubrication pipe through which lubricating oil is supplied to a rotary machine disposed in a case;
    a second lubrication pipe through which the lubricating oil is supplied to a bearing member disposed in the case; and
    one or more oil pumps that supply the lubricating oil to the first lubrication pipe and the second lubrication pipe, wherein:
    the lubrication structure includes
        a first oil hole provided in the case to supply the lubricating oil to the rotary machine, the first lubrication pipe being connected to the first oil hole, and
        a second oil hole provided in the case to supply the lubricating oil to the bearing member, the lubricating oil flowing into the second oil hole from the second lubrication pipe;
    a connection portion between the first lubrication pipe and the first oil hole is located at a position above an opening portion of the second oil hole such that at least a part of the lubricating oil that has flowed out from the connection portion flows into the second oil hole;
    the vehicle is a hybrid electric vehicle that includes an engine, a power transfer device that transfers a drive force transferred from the engine to drive wheels via an output portion, and a travel rotary machine coupled to the output portion;
    the power transfer device and the travel rotary machine are housed in the case, the travel rotary machine is the rotary machine, the bearing member is provided to support a predetermined rotary element of any of the power transfer device and the rotary machine, and the one or more oil pumps include an input pump mechanically rotationally driven by the engine to discharge the lubricating oil and an output pump coupled to the output portion and mechanically rotationally driven to discharge the lubricating oil; and
    the lubricating oil is supplied from the input pump to the first lubrication pipe and used to cool a stator of the travel rotary machine, and the lubricating oil is supplied from the output pump to the second lubrication pipe and used to lubricate the bearing member.

2. The lubrication structure according to claim 1, wherein the first lubrication pipe is loosely fitted in the first oil hole with a predetermined gap without interposing a seal member at the connection portion such that the lubricating oil leaks out and flows downward from the connection portion even at an extremely low temperature at which a viscosity of the lubricating oil is high.

3. The lubrication structure according to claim 1, wherein a V-shaped or U-shaped oil receiver that opens upward and becomes wider upward is provided at the opening portion of the second oil hole, and the connection portion is positioned such that at least a part of the connection portion overlaps the oil receiver in a vertical direction.

4. The lubrication structure according to claim 1, wherein a discharge capacity of the input pump is larger than a discharge capacity of the output pump.

5. The lubrication structure according to claim 1, wherein the opening portion of the second oil hole is located off a position directly below the connection portion, and an oil guide in an inclined gutter shape is provided directly below the connection portion to guide at least a part of the lubricating oil that has flowed out from the connection portion into the second oil hole.

* * * * *